United States Patent [19]

Costello et al.

[11] Patent Number: 4,474,385

[45] Date of Patent: Oct. 2, 1984

[54] REMOVABLE WHEEL ASSEMBLY FOR WHEELCHAIRS

[75] Inventors: William D. Costello, Ventura; Charles J. Helton, II, Camarillo; Martin B. Frank, Los Angeles, all of Calif.

[73] Assignee: American Hospital Supply Corporation, Evanston, Ill.

[21] Appl. No.: 497,993

[22] Filed: May 25, 1983

Related U.S. Application Data

[63] Continuation-in-part of Ser. No. 361,239, Mar. 24, 1982, Pat. No. 4,442,660.

[51] Int. Cl.[3] .......... B62M 1/14

[52] U.S. Cl. .......... 280/242 WC; 280/289 WC; 280/304; 280/647; 297/DIG. 4; 301/132

[58] Field of Search .......... 280/242 WC, 289 WC, 280/296, 304, 647; 297/DIG. 4; 301/119, 125, 132, 135

[56] References Cited

U.S. PATENT DOCUMENTS

| | | | |
|---|---|---|---|
| 2,882,063 | 4/1959 | Strasel | 301/132 |
| 3,889,964 | 6/1975 | Pitts | 280/242 WC |
| 4,360,213 | 11/1982 | Rudwick et al. | 280/242 WC |
| 4,392,690 | 7/1983 | Anderson | 280/242 WC |

*Primary Examiner*—Joseph F. Peters, Jr.
*Assistant Examiner*—D. Lynn Fugate
*Attorney, Agent, or Firm*—Roger A. Williams

[57] ABSTRACT

An assembly which can be mounted to a wheelchair to provide easy removal of the drive wheels yet retain mobility of a wheelchair includes a connector block mounted on a wheelchair frame, which connector block has a first orifice extending therethrough for receiving an axle of a drive wheel of a wheelchair and a second orifice extending therethrough and at least partially intersecting the first orifice. A drive wheel axle having an annular groove at one end extends into the first orifice of the connector block such that the annular groove aligns with the second orifice. A rod rotatable about its longitudinal axis extends through the second orifice of the connector block with at least a portion of the rod having a generally circular cross section and a slot therealong. The slot aligns with the first orifice of the connector block. A first arm is fastened to and extends radially from the rod and moves with rotation of the rod. A second arm is pivotally linked to the first arm. A leg is pivotally linked to the second arm and slidably mounted to the frame. A caster wheel assembly is attached to the leg and cooperates with the leg, rod, first arm and second arm to move between a surface-engaging position and surface-disengaging position upon rotation of the rod such that the rod intersects the annular groove of the axle when the caster wheel assembly is in the surface-disengaging position and the slot on the rod aligns with the first orifice and faces the annular groove of the axle when the caster wheel assembly is in the surface-engaging position.

21 Claims, 12 Drawing Figures

FIG. 8
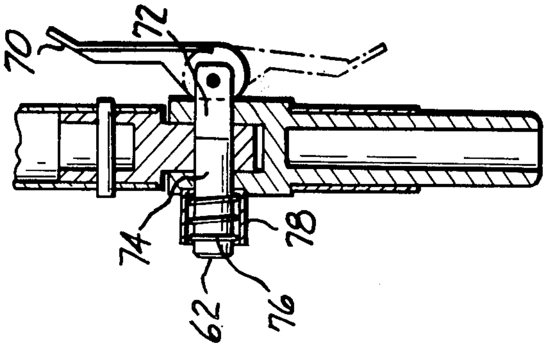
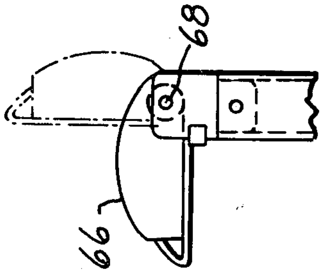
FIG. 9
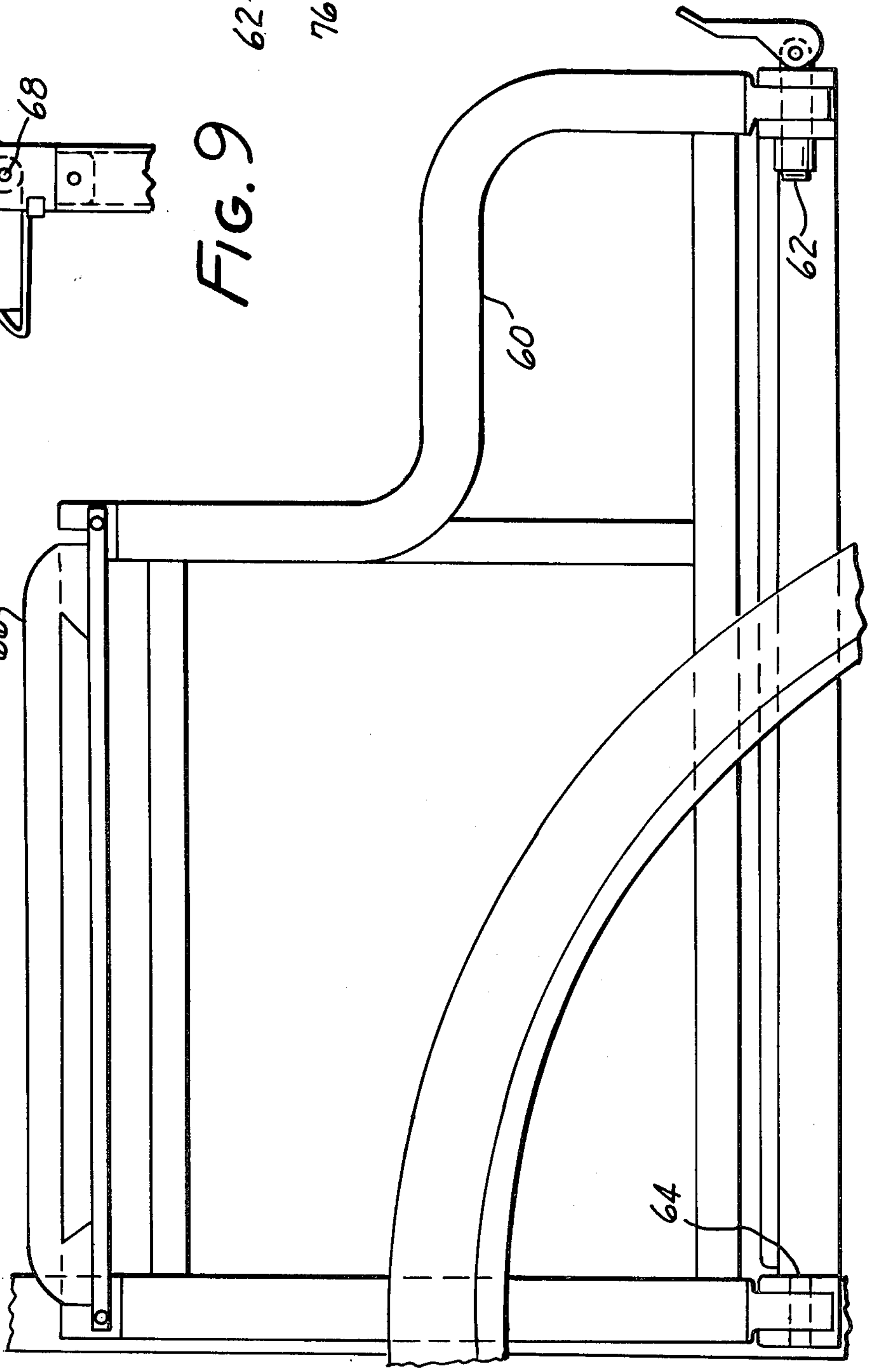
FIG. 7

REMOVABLE WHEEL ASSEMBLY FOR WHEELCHAIRS

CROSS-REFERENCE TO RELATED APPLICATIONS

This patent application is related to and a continuation-in-part of U.S. Ser. No. 361,239, filed Mar. 24, 1982 now U.S. Pat. No. 4,442,660 and entitled "Removable Wheel Assembly For Wheelchairs."

BACKGROUND OF THE INVENTION

The invention herein relates to an improved wheelchair. Wheelchairs are generally formed in various configurations, but basically each has a tubular metal frame with a seat stretched on the frame. The frame supports main drive wheels axially connected to the frame and secondary wheels axially connected to the frame for providing balance and steering. Generally, the drive wheels are positioned adjacent the back of the wheelchair and the secondary wheels are positioned at the front of the wheelchair.

Some wheelchairs are collapsible so that they can stowed when not in use. It is important to have the collapsible wheelchairs as small as possible when in a collapsed state. In many wheelchairs, the collapsed state is often quite large because the wheels and wheel hubs extend outwardly, adding to the width of the wheelchair. If the wheels remain on the wheelchair in its collapsed state, the wheels themselves add to the difficulty in positioning the wheelchair in a compact space, such as the trunk or rear seat portion of a car.

It would be desirable to have a wheelchair on which the large drive wheels could be removable, simply and readily to facilitate collapsing and storing of the wheelchair. It would be further desirable to have a wheelchair which can have its drive wheels removable by the person sitting in the chair. Such a chair could avoid the need of having an attendant accompany the person confined to the wheelchair as he travels.

It would also be highly desirable to have an assembly which could be adapted to or mounted on state of the art wheelchairs and which would enable such wheelchairs to have their drive wheels removable by the person confined to the wheelchair.

It would be desirable to have a wheelchair assembly for which the large drive wheels could be removed while still providing mobility to the wheelchair when such drive wheels are removed. Such a chair could be operated by a wheelchair confined person having upper body movement who could maneuver the wheelchair by grasping nearby objects to pull or push the wheelchair. Such a chair would be capable of operating in areas which would be restrictive to a normal wheelchair having the large drive wheels attached.

SUMMARY OF THE INVENTION

The invention herein is directed to an improved wheelchair and an assembly which can be mounted on conventional wheelchairs to provide removability to the large drive wheels of the wheelchair. Whether the assembly is incorporated on a wheelchair or mounted to an existing wheelchair, it can provide the ability to the occupant of the wheelchair to be able to remove the large drive wheels. Thereby, to occupant is able to more readily store and transport the wheelchair and drive wheels. The assembly herein also provides improved characteristics to the wheelchair on which it is mounted. If added features described herein are incorporated on the wheelchair, the occupant of the wheelchair can more easily transfer from the wheelchair to an adjacent surface such as a vehicle, chair, bed and the like.

The assembly herein comprises a first rod which is rotatable about its longitudinal axis. The first rod can be mounted to a wheelchair frame such that the first rod extends from the front toward the back of the frame. The first rod is mounted to the wheelchair to permit the rod to be rotated about its longitudinal axis. The first rod can be mounted to the frame of the wheelchair with a suitable bracket having a bearing through which the rod extends. The bracket can be secured to the frame of a wheelchair.

A handle is attached to the first rod and extends radially from the first rod. Preferably, the handle is attached to the first rod at the forward end of the rod. The handle is so fixed to the first rod such that movement of the handle causes rotation of the first rod about its longitudinal axis.

The assembly further comprises a connector block assembly which can be mounted on the frame of a wheelchair. The connector block assembly can comprise two separate sections: the connector block and a clamping member. The connector block has a first orifice extending therethrough for receiving an axle of a drive wheel of the wheelchair. The connector block also has a second orifice extending therethrough, which second orifice at least partially intersects the first orifice. The second orifice is provided in the connector block for receiving an extension of the first rod. The connector block and clamping member can encircle a portion of the tubular frame of the wheelchair to enable clamping of the connector block and clamping member to the frame using suitable clamping elements, such as threaded bolts.

The invention herein includes the use of a uniquely designed axle for the drive wheels. That is, if the assembly is mounted on a conventional wheelchair, the conventional axle is discarded and the axle of the present invention utilized. The axle herein has an annular groove at one end such that when the axle is inserted into the first orifice of the connector block the annular groove aligns with the second orifice.

An extension on the first rod is inserted into and through the second orifice of the connector block. The cross section of the first rod can be generally may configuration, but a portion of the extension of the first rod has a generally circular cross section. Along such a portion of the extension of the first rod having a circular cross section there is a slot. The slotted portion of the extension has a cross section which is generally a truncated circular cross section. When the extension is inserted into the second orifice of the connector block, the slot on the extension aligns with the first orifice. When both the axle and extension of the first rod are inserted into their respective orifices of the connector block, the axle can be either selectively fixed or removable from the connector block. That is, if the extension of the first rod is rotated about its longitudinal axis such that the circular portion of the truncated circular cross section engages the annular groove of the axle, the axle is fixed in the connector block. If the extension of the first rod is rotated about its longitudinal axis such that the slot on the extension faces the annular groove of the axle, the axle can be withdrawn from the connector block.

The assembly herein includes apparatus for lifting the wheelchair to raise the drive wheels off the surface on which they rest to enable their removal from the wheelchair. The lifting portion of the assembly operates cooperatively with the rotation of the first rod which releases the axle of the drive wheel.

The lifting apparatus comprises a first arm which is fastened to and extends radially from the first rod. The first arm is fastened to the first rod such that rotation of the first rod moves the first arm. A second arm is pivotally linked to the first arm. The pivotal linkage is provided along the first arm spaced from the first rod.

A leg is pivotally linked to the second arm at a second pivotal linkage linking the first and second arms. The leg can move between a surface-engaging position and a surface-disengaging position. The leg is mounted to the frame of the wheelchair through a bracket which permits sliding or movement of the leg between its surface-engaging position and surface-disengaging position.

A tensioning spring is operatively connected to the leg. The tensioning spring can be a biasing spring which tends to retain the leg in a surface-disengaging position. Such a biasing spring can have one of its ends connected to the connector block with the remaining end connected to the leg to operate as an extension spring. In an alternative embodiment, the biasing spring can be within the bracket structure which mounts the leg onto the wheelchair frame to operate as a compression spring. In another alternative embodiment, a torsion spring can be affixed to the first arm and connector block and suitably pretensioned. The tensioning spring, leg, first and second arms cooperate with the first rod such that upon rotation of the first rod the leg can be either moved to its surface-engaging position or surface-disengaging position.

In a modification of the assembly herein, a caster wheel is attached to the end of the leg which is pivotally linked to the second arm at a second pivotal linkage linking the first and second arms in the lifting apparatus. As the lifting apparatus is engaged as discussed above, the caster wheel can move between a surface-engaging position and a surface-disengaging position. The leg to which the caster wheel is mounted is itself mounted to the frame of the wheelchair through a bracket which permits sliding or movement of the leg between such a surface-engaging position and a surface-disengaging position.

A tensioning spring is operatively connected to the leg. The tensioning spring can be a biasing spring which tends to retain the leg and caster wheel in a surface-disengaging position. such a biasing spring can have one of its ends connected to the connector block with the remaining end connected to the leg to operate as an extension spring. In an alternative embodiment, the biasing spring can be within the bracket structure which mounts the leg onto the wheelchair frame to operate as a compression spring. In still another alternative embodiment, a torsion spring can be affixed to the first arm and connector block and suitably pretensioned. The tensioning spring, leg with caster wheel, first and second arms cooperative with a first rod such that upon rotation of the first rod, the caster wheel mounted on the leg can be either moved to its surface-engaging position or surface-disengaging position.

In the assembly wherein a caster wheel is mounted on the leg, the lifting assembly can include a caster lock assembly. The caster lock assembly can be mounted on the lifting apparatus. When the embodiment of the caster locking apparatus includes a mounting on the caster wheel having an aperture through which a bolt can be engaged or disengaged. The bolt can be spring actuated either to engage or disengage from the caster wheel. When the bolt is engaged with the caster wheel, the caster wheel is prevented from swiveling. When the bolt is disengaged, the caster wheel is free to swivel. The bolt can be tensioned by a spring assembly such as a compression or extension spring. An actuating lever which can be reached by the wheelchair confined person can be actuated to move the bolt from the engaging and disengaging positions. For example, the actuating lever can be an eccentric cam lever which can overcome the tension in the spring to engage or disengage the bolt from the caster wheel assembly.

In the wheelchair assembly herein wherein a caster wheel is mounted on the leg of the lifting apparatus, a separate floor stand bracket can be mounted on the frame of the wheelchair to provide stabilization of the wheelchair when the drive wheels are removed or to immobilize the wheelchair when the drive wheels are removed. The floor stand bracket can be mounted on the frame and can include a foot which is threadable into the bracket to provide positionability with regard to height. The height of the floor stand bracket is positioned such that when the main drive wheels are on the chair, the floor stand bracket does not engage the surface which supports the chair. When the lifting apparatus is actuated causing the caster wheels to move to a surface-engaging position, then again the floor stand bracket does not engage the surface. After the drive wheels have been removed and the caster wheels moved to the surface-disengaging position, then the floor stand bracket engages the surface upon which the wheelchair rests, preventing movement of the wheelchair.

BRIEF DESCRIPTION OF THE DRAWINGS

The assembly herein will be better understood with regard to the following detailed description of the preferred embodiment and accompanying drawings wherein:

FIG. 7 is a side elevational view of a fold down arm assembly;

FIG. 8 is an enlarged fragmentary cross-sectional view of the clip shown in FIG. 7;

FIG. 9 is a fragmentary end elevational view of the assembly of FIG. 7;

DETAILED DESCRIPTION

The assembly herein is a modification and improvement over the assembly disclosed in co-pending Ser. No. 361,239, filed Mar. 24, 1982, titled "Removable Wheel Assembly For Wheelchairs," the entire disclosure of which is incorporated herein by this reference.

Figure 1:
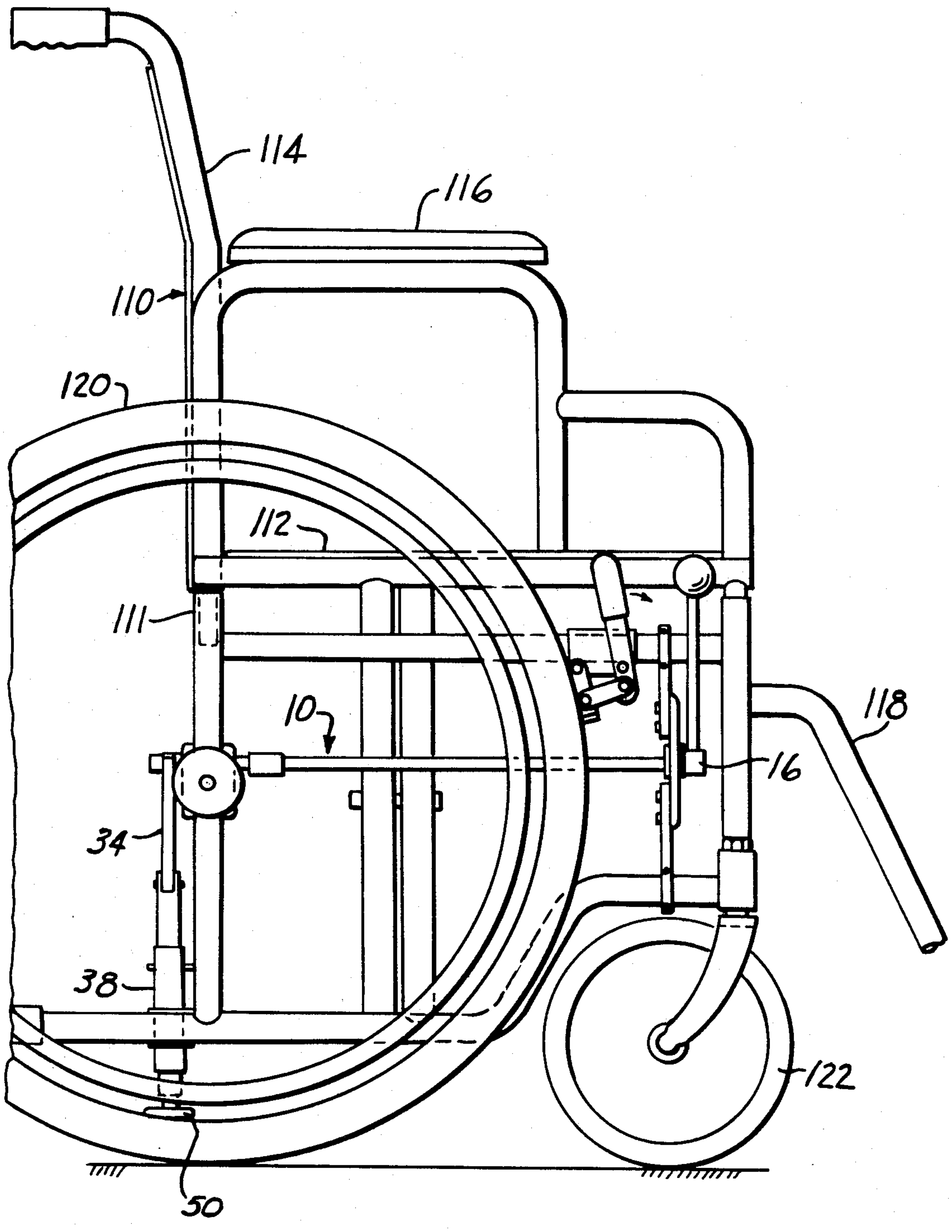
FIG. 1 is a partially fragmented lateral view of a wheelchair showing the assembly of the invention herein mounted to the frame of the wheelchair.

Referring now to FIG. 1 of the drawings, the assembly of the present invention is shown in use on a wheelchair. An advantage of the present assembly is that it can be mounted on existing wheelchairs or can be mounted on wheelchairs at the time of manufacture.

As shown in FIG. 1, a wheelchair 110 comprises a structural frame 111 which for strength is generally a tubular metal frame. Attached to and extending between portions of the frame is a seat 112 and a back 114. Along the sides of the seat are arms 116. A leg rest 118 extends outwardly and downwardly for supporting the legs of the person confined to the wheelchair.

Generally wheelchairs are four-wheeled vehicles. There is usually two large drive wheels 120 located at the back of the wheelchair and two smaller caster wheels 122 at the front of the wheelchair. The drive wheels are attached to the wheelchair frame through an axle fixed to the frame. The caster wheels are attached to the wheelchair through a swivel mounting which permits the caster wheels to turn freely to accomodate the direction of travel of the wheelchair as is dictated by the manipulation of the drive wheels or attendant pushing the wheelchair.

The assembly 10 herein provides for lifting of the drive wheels 120 and simultaneously releasing the drive wheels so that they can be removed from the wheelchair. The assembly herein is mounted in duplicate to a wheelchair in order to enable removal of both of the drive wheels. For ease of discussion herein, only one assembly mounted on one side of the wheelchair will be described, although it is understood that for operation to remove both drive wheels, a second mirror image assembly is mounted to the other side of the wheelchair.

Figure 2:
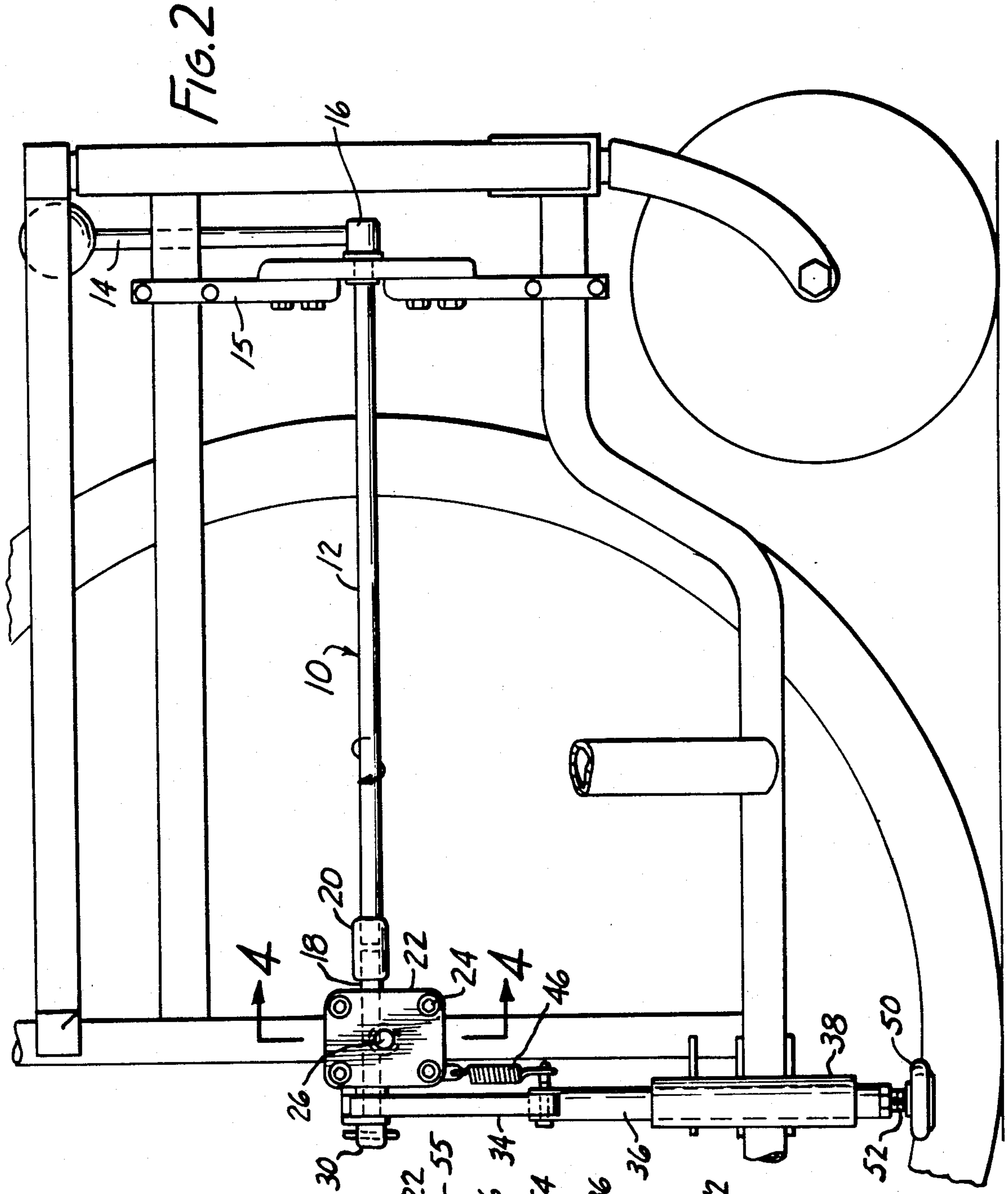
FIG. 2 is a cross-sectional view of a wheelchair illustrating the assembly herein which schematically shows how the assembly can be mounted to a wheelchair.

Referring to FIG. 2 which is a cross-sectional view of a wheelchair looking outwardly toward a drive wheel, the assembly 10 herein is shown mounted to the wheelchair frame. The assembly 10 comprises a first rod 12 mounted to the wheelchair such that the first rod can be rotated about its longitudinal axis. The first rod extends from the front toward the back of the frame of the wheelchair. The first rod can have any desirable cross-sectional configuration along the major portion of its length, such as circular, square, rectangular, pentagonal, hexagonal, octagonal and the like.

Figure 3:
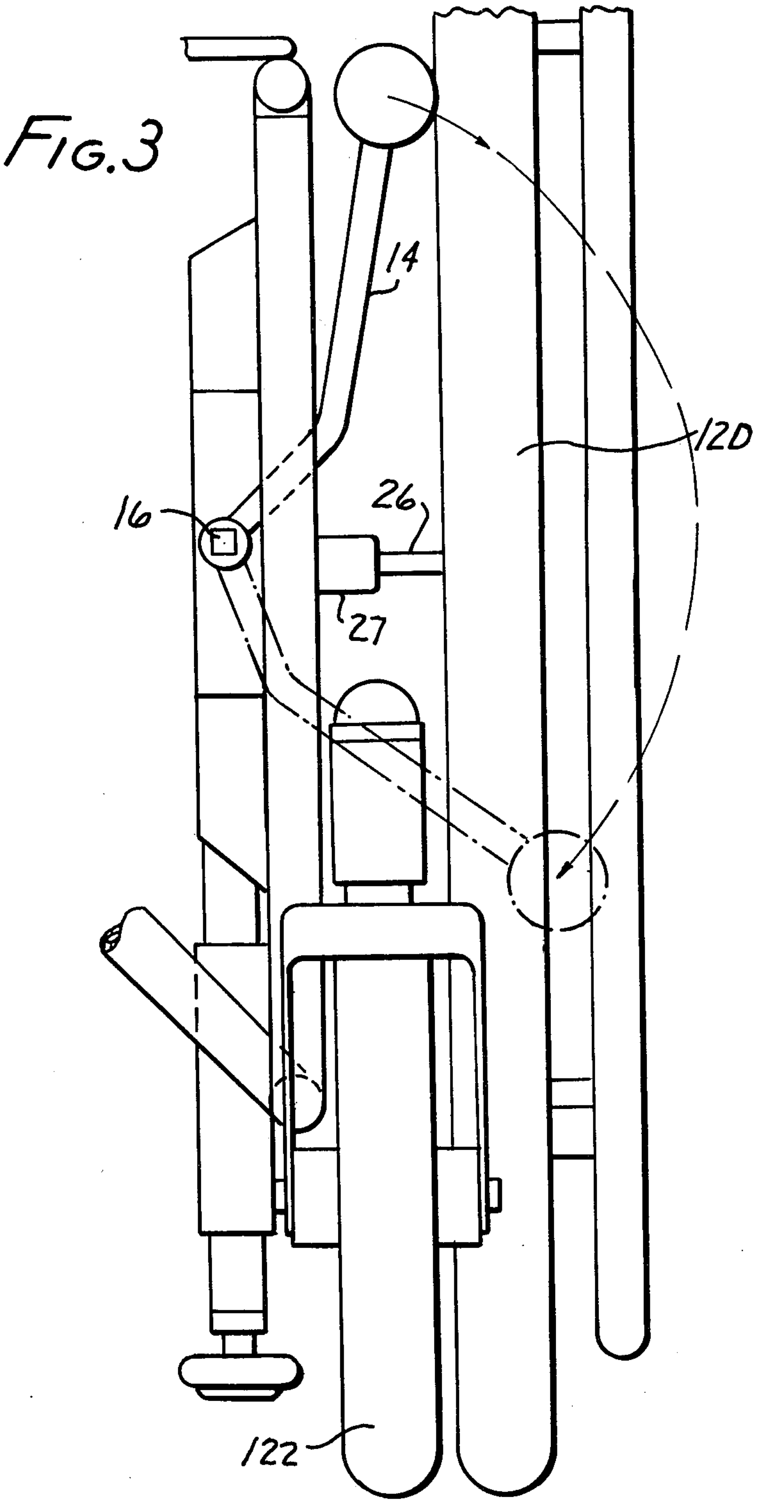
FIG. 3 is an enlarged fragmentary end elevational view of the assembly shown in FIG. 2.
Figure 10:
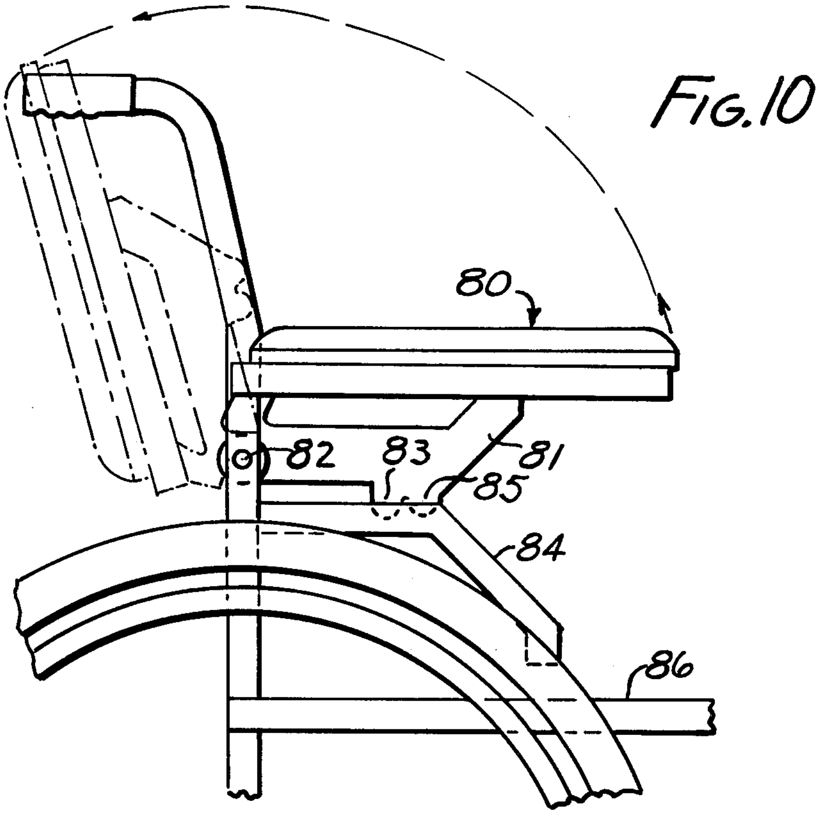
FIG. 10 is a fragmentary side elevational view of a flip up arm assembly mounted to the frame of the wheelchair.

An actuating handle 14 is connected to the first rod adjacent the front of the wheel chair. The handle is attached radially to the first rod. That is, the handle extends generally radially from the longitudinal axis of the first rod. As shown in FIG. 3, the handle can be configured with a bend. The handle is securely attached to the first rod so that movement of the handle through the arc shwon in phantom in FIG. 3 will concomitantly rotate the first rod about its longitudinal axis.

A mounting assembly 15 can be used to mount the first rod to the tubular frame of the wheelchair at the front of the wheelchair. The mounting assembly can be any convenient assembly, such as the threaded bolt assembly and brackets shown in FIG. 2. The mounting assembly 15 provides a mechanism by which the assembly 10 herein can be adapted to an existing wheelchair.

A second rod 18 is attached to the first rod 12 through a suitable coupling 20. The first and second rods are attached so that rotation of the first rod causes rotation of the second rod. The longitudinal axis of the second rod 18 aligns with the longitudinal axis of the first rod. Although in the preferred embodiment a first and second rod are present, the invention herein contemplates that one rod could be used herein if an extension of the rod includes a configuration as will hereinafter be described in regard to the second rod 18.

The second rod 18 is, preferably, generally circular in cross section. However, a slot is cut into the second rod such that a portion of the second rod has a truncated circular cross section. The truncated circular cross section 19 is shown clearly in FIG. 4. The benefits of the circular and truncated circular cross sections caused by a slot being formed along the second rod will be more fully described hereinafter.

A connector block 22 is mounted to the frame of the wheelchair at a location where the drive wheel axle mounts to the wheelchair frame. The connector block has a first orifice which extends therethrough for receiving an axle of a drive wheel of the wheelchair. The connector block also includes a second orifice extending therethrough, which second orifice at least partially intersects the first orifice. The second orifice is provided for receiving the second rod. A clamping member 23 which, when combined with the connector block, can encircle a portion of the tubular frame of the wheelchair to secure the connector block to the wheelchair. The connector block is attached to the frame of the wheelchair such that the clamping member 23 would be on the outside of the wheelchair frame and the connector block would be on the inside of the frame. Clamping elements 24, such as threaded bolts, can be used to interlock the connector block and clamping member to the tubular frame 29. The connector block is positioned along the tubular frame of a wheelchair such that the first orifice aligns with the drive wheel axle orifice of the wheelchair frame. Thus, an axle inserted through the first orifice of the connector block will also extend through the frame of the wheelchair.

The assembly herein contemplates the use of a specially designed axle for the main drive wheels of the wheelchair on which the assembly is mounted. It will be appreciated that the original axle of a wheelchair, which is commonly threadedly attached to the wheelchair frame through an internally threaded sleeve, is replaced with axle 26. Such an axle includes split rings and corresponding washer assemblies 21 and 25.

The split rings engage spaced apart axle grooves to define a predetermined axle length within which the wheel hub of a main drive wheel wil fit securely. The washers operate as spacers to allow for differing vehicle wheel hub widths. The clamping member 23 includes a large opening which is necessary for assembly of the drive wheel to the frame so that an internally threaded sleeve 27 can pass into the opening allowing the ring to abut against an outer boss of the threaded sleeve.

The axle 26 includes an annular groove 28 adjacent its end that is inserted into the connector block. The groove extends around the circumference of the axle and preferably corresponds in shape to a semicircle.

That is, the groove is rounded and about semicircular in shape.

In a preferred embodiment of the present invention, the longitudinal axis of the first orifice extends about perpendicular to the longitudinal axis of the second orifice. Thus, when the axle is inserted into the first orifice and the second rod is inserted into the second orifice, the longitudinal axes of the axle and second rod are perpendicular.

Figure 4:
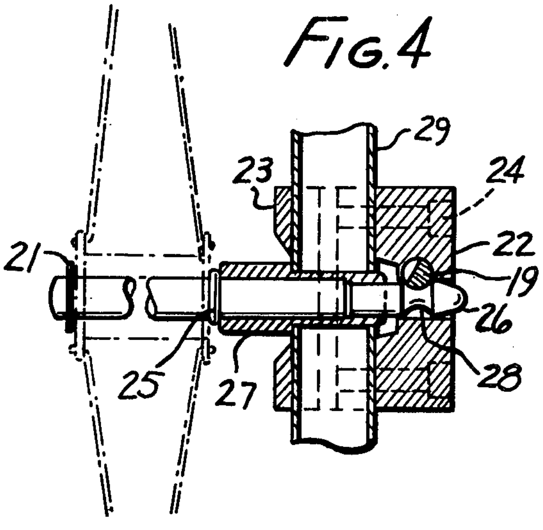
FIG. 4 is an enlarged cross-sectional view of the connector block taken along line 4—4 of FIG. 2.

The annular groove on the axle is positioned such that when the axle is inserted into the first orifice of the connector block, the annular groove 28 aligns with the second orifice extending through the connector block. As shown in FIG. 4, the second rod intersects the axle at the annular groove. The slot is cut into the second rod such that when the second rod is inserted into the connector block, the slot aligns with the first orifice. The axle can thereby be locked or released from the connector block by positioning the second rod through rotation about its longitudinal axis. FIG. 4 shows the axle fixed within the connector block. When the second rod 18 is rotated to place the slot on the second rod adjacent or facing the axle, then the axle is released from the connector block. In such a released configuration, the axle can be withdrawn from the connector block.

Aligning the slot in the second rod with the annular groove in the axle permits the axle to be withdrawn from the connector block. When the second rod is rotated such that a portion of the second rod intersects the annular groove on the axle, the axle cannot be withdrawn from the connector block.

Figure 5:
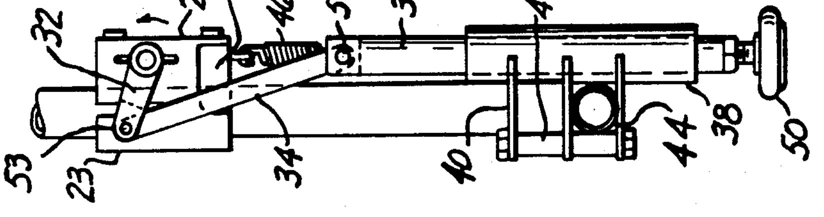
FIG. 5 is another fragmentary end elevational view of the assembly shown in FIG. 2.

An extension 30 of the second rod 18 extends beyond the connector block after having passed through the connector block through the second orifice. Attached to the extension 30 is a first arm 32. Referring to FIG. 5, the first arm 32 extends radially from the extension of the second rod. The first arm is attached to the extension such that rotation of the extension causes movement of the first arm. Although shown in the drawings as attached to the extension of the second rod extending beyond the connector block, the first arm can be attached to the second rod before the second rod enters the connector block.

A second arm is pivotally linked through a pivot pin 53 to the first arm. Through such a pivotal linkage, the second arm is free to move concomitantly with the first arm.

The second arm is also pivotally linked through a pivot pin 54 to a leg 26. The leg 36 can be a bar or rod having axial length which is pivotally linked at one of its ends to the second arm. The leg 36 extends through a sleeve 38 which maintains the leg in a generally upright orientation. The inner diameter of the sleeve 38 is slightly larger than the outer diameter of the leg 36. The leg 36 is capable of sliding up and down through the sleeve. The sleeve maintains the leg in an uprightly extending orientation as the sleeve can be fastened to the frame of the wheelchair. As shown in FIG. 5, the sleeve is attached to a support bracket 40 which can be secured to the frame 44 of the wheelchair, such as by using a threaded bolt assembly 42.

The leg 36 of the assembly extends through and beyond the sleeve 38. Attached to the lower end of the leg can be a foot 50. The foot 50 can be attached to the leg through a threaded rod assembly 52. The threaded rod assembly provides the capability of adjusting the position of the foot in regard to the end of the leg. The foot can have a relatively larger diameter than the leg 36. Such a larger diameter permits the foot to engage the surface upon which the wheelchair rests and thereby aids in establishing a solid support when lifting the drive wheel off the surface.

Referring to FIGS. 2 and 5, an extension spring 46 is shown which interconnects the connector block 22 and leg 36. The spring is provided to apply tension to the leg for retaining the leg in a surface-disengaging position. Such a tensioning device as the spring assists in raising the leg 36.

Figure 6:
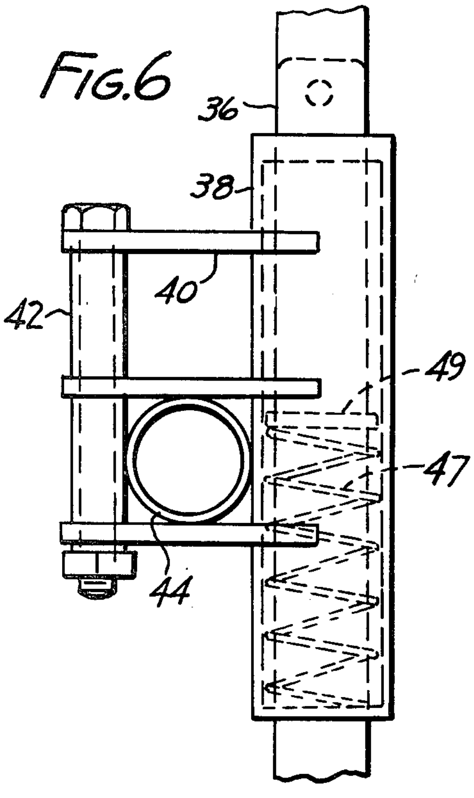
FIG. 6 is an enlarged fragmentary end elevational view of another embodiment of a portion of the assembly.

An alternate embodiment of the tensioning device can be a compression spring 47 shown in FIG. 6, In the alternate embodiment, a spring 47 is provided within the sleeve 38. The leg 36 is provided with an outwardly extending projection 49 which interconnects with the spring 47 and prevents the spring from moving past such projection. As the leg 36 is moved downwardly, it compresses the spring 47, thereby applying a tension in the spring which exerts a force upwardly tending to raise the leg 36.

Figure 12:
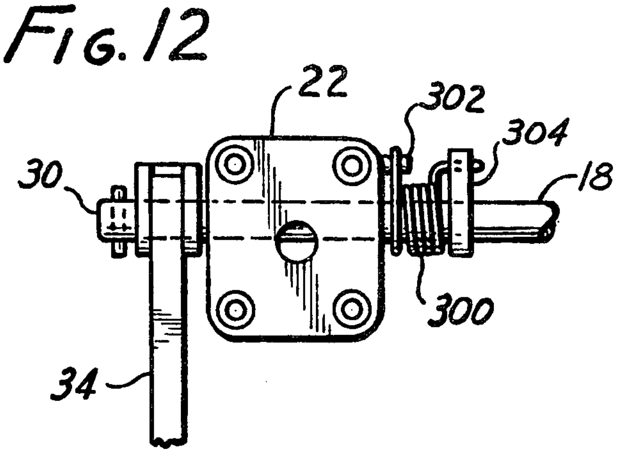

In still another embodiment shown in FIG. 12, a torsion spring 300 could be fastened to the connector block 22 such as at pin 302 and second rod 18 such as at fixed collar 304. The torsion spring can be pretensioned to apply a tension which exerts a force, tending to maintain the leg in a surface-disengaging position.

The spring, leg, first and second arms and first and second rods cooperatively operate to move the leg between a surface-engaging position and a surface-disengaging position. In the normal functioning of the wheelchair, the leg is in a surface-disengaging position. That is, the leg is in a position near its uppermost path of travel such that the foot is above the surface on which the drive wheel rests. When the leg is in such a surface-disengaging position, the second rod 18 is in a position as shown in FIG. 4 wherein the second rod intersects the annular groove 28 of the axle of the drive wheel. The drive wheel is thereby locked at its axle to the wheelchair frame. Preferably, the actuating handle 14 is in an upwardly extending position as is shown in FIG. 2.

To raise the drive wheel off the ground and move the leg into its surface-engaging position while simultaneously releasing the axle of the drive wheel, the actuating handle 14 is rotated downwardly as is shown in the dashed and phantom lines of FIG. 3. The movement of the actuating handle downwardly causes the first rod 12 to rotate about its longitudinal axis. Simultaneously, the second rod rotates about is longitudinal axis. As the second rod rotates, it moves the slot into a position adjacent the axle such that the second rod no longer interconnects with the annular groove of the axle.

The rotation of the second rod also moves the first arm 32 in a downwardly direction. The second arm and leg which are pivotally linked to the first arm move with the movement of the first arm and thereby also move in a downwardly direction. The distance of travel of the leg 36 is calibrated to the rotation of the second rod. That is, the distance of travel and rotation are calibrated such that when the slot of the second rod is aligned for releasing the axle from the connector block, the leg is in a surface-engaging position; i.e., lowermost path of travel, such that the drive wheel is lifted from the surface on which it has rested. The drive wheel is lifted a sufficient distance to enable its removal from the wheelchair. That is, the path of travel of the leg is greater than the distance from the foot to the surface upon which the wheelchair rests. Such distance can be changed by screwing the foot inwardly or outwardly along the threaded rod 52. Thus, when the leg has completed its path of travel, the drive wheel will be lifted off the surface. When the drive wheel is lifted from the surface, it can be readily removed from the frame by withdrawing the axle 26 from the first orifice of the connector block.

The leg can be locked in the surface-engaging position, that is, with the drive wheels raised off of the surface. The locking mechanism comprises a protruding head on the pivot pin 53. The head protrudes and projects inwardly toward the connector block 22. A recess 55 is provided on the connector block 22. As the first arm 32 rotates about the extension of the second rod, it moves through an arc and is received in the recess 55. The recess 55 extends a sufficient distance across the connector block such that the first arm can travel in an arc at least 5° past a vertical center line extending from the center of the second rod. Additional travel of the first arm is prevented past such a 5° arc as the projecting head of the pivot pin 53 encounters the connector block, i.e., side wall of the recess within the connector block. The leg is thereby locked in the surface-engaging position. The leg can be released by moving the actuating handle 14. While the leg is in the surface-engaging position, the wheelchair will remain stable in the raised position with the axle released permitting either its removal or insertion.

The drive wheels can be reattached by inserting the axle into the first orifice of the connector block and thereafter pulling upwardly on the actuating handle 14. Such movement of the actuating handle rotates the second rod, thereby interlocking the second rod with the annular groove of the axle while simultaneously lifting the leg to the surface-disengaging position. In such position, the drive wheel again rests upon the surface.

As discussed earlier, the first and second rods can be combined such that they constitute one continuous rod. However, it is preferable to have the first and second rods separate. The use of two rods is preferred as it provides adaptability of the assembly. For example, some patients in wheelchairs do not have the use of their upper torso or arms. Thus, the actuating handle located at the front of the wheelchair may not be needed. An attendant would be able to use the handle to raise and release the drive wheels. However, the assembly may be less expensive by omitting the handle and first rod and merely providing the assembly as the second rod, connector block, first and second arms, leg and sleeve. In such a modified assembly, the extension of the second rod beyond the connector block can be provided with a socket or handle engaging end which can be engaged by either a socket or accessory handle which when connected to the extension can be used to rotate the second rod to release the axle and move the leg into a surface-engaging position. The extension can be accessed from the rear of the wheelchair, thus enabling the attendant to readily raise the drive wheels off the surface for their removal. Such a modified assembly can be useful where it is desirable to prevent the occupant of a wheelchair from releasing the drive wheels.

Figure 11:
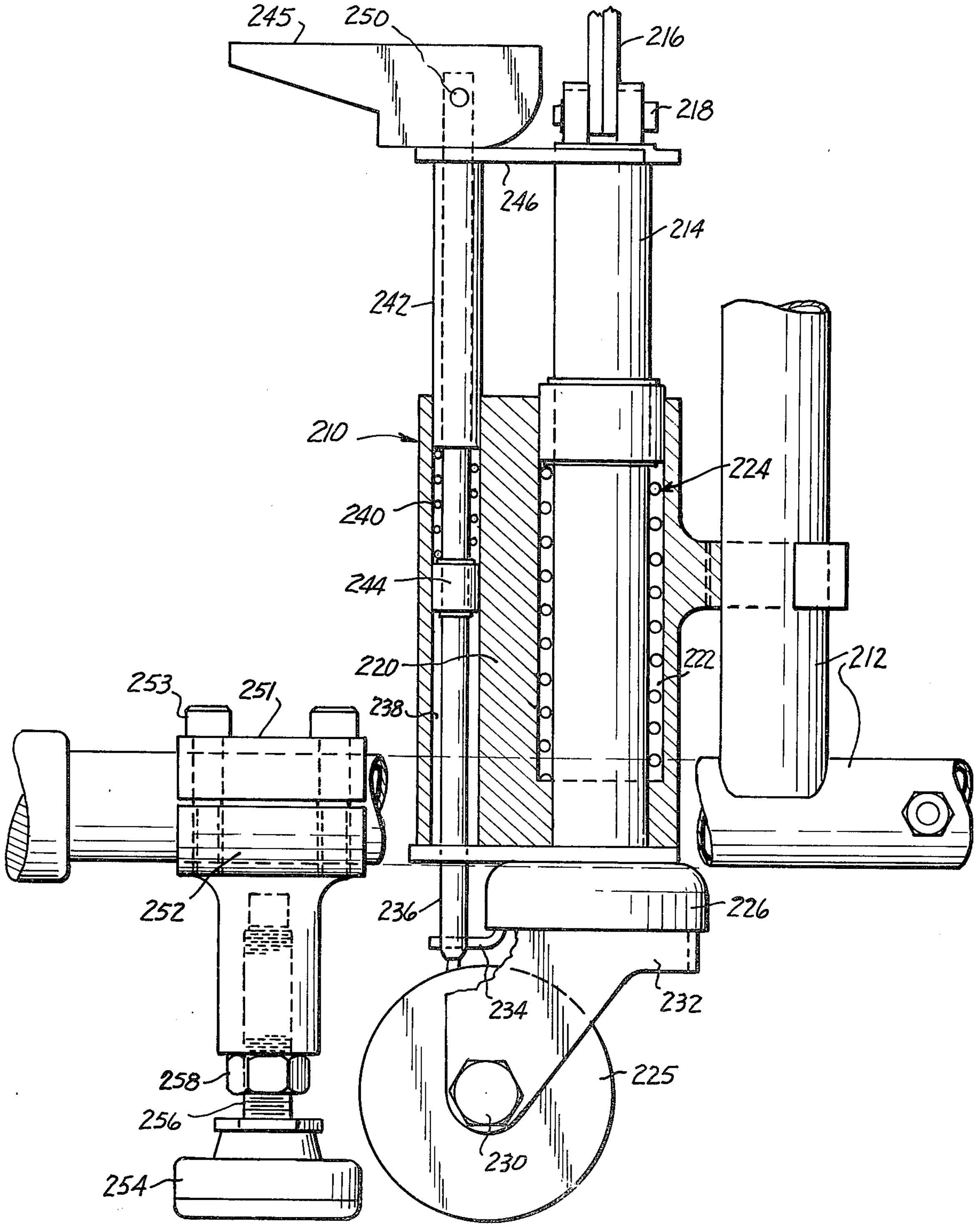
FIG. 11 is a cross-sectional view of a wheelchair illustrating an embodiment of the assembly herein wherein a caster wheel is mounted on the lifting apparatus and FIG. 12 is a side elevational view partially fragmented illustrating an embodiment of a tensioning means for positioning the caster wheel assembly in a surface-disengaging position.

The removable wheel assembly herein which can be mounted on a wheelchair frame also includes the embodiment shown in FIG. 11. The embodiment shown in FIG. 11 includes the actuating mechanism shown in FIG. 2 up and to the first arm 32 and second arm 34 for actuating the lifting operation of the removable wheel assembly. The second arm 34 shown in FIG. 2 corresponds to the second arm 216 for which a portion is illustrated in FIG. 11. The second arm 216 is pivotably connected through the pivot pin 218 to a leg 214 which corresponds to leg 36 of the embodiment shown in FIGS. 2 and 5.

The leg 214 extends through a sleeve 222 within a housing 220. The housing 220 is adapted such that it can be bolted to the frame 212 of the wheelchair. The housing 220 can be provided in two portions which can be placed on opposite sides of the wheelchair frame, then using suitable bolts (not shown) bolted together to attach the housing to the wheelchair frame. Each portion of the housing can be appropriately provided with one half of the indentation needed to receive the leg and sleeve. Alternatively, the leg and sleeve can be inserted through either portion of the housing when the housing is provided in two sections.

Within the housing 220 is a compression spring 224. The compression spring is appropriately mounted within the sleeve of the housing such that in its normal noncompressed state it maintains or assists in maintaining the leg in a surface-disengaging position. Compression tension can be placed on the spring by operating the actuating mechanism which lowers the second arm 216 and correspondingly the leg 214. The operation of lowering the leg 214 lowers the leg to a surface-engaging position.

Attached to the lower end of the leg 214 is a wheel assembly 226. The wheel assembly is a caster wheel assembly which is free to freely rotate about the leg 214. The wheel assembly 226 can be appropriately a ball bearing caster wheel assembly. The wheel assembly includes a wheel 228 and fork 232 to which the wheel is attached to an axle 230. By providing a caster wheel assembly, the wheel 228 is free to rotate about the leg 214, thereby providing directionability to the rear end of the wheelchair. Thus, the wheelchair, after the drive wheels have been removed, can be readily turned around because of the front and rear caster wheels being freely pivotable.

Attached to the wheel assembly 226 is a bracket 234. The bracket has an aperture which receives a bolt such as cylindrical bolt 236. The bolt 236 can be moved from a bracket-engaging to a bracket-disengaging position. When the bolt id a bracket-engaging position, it is positioned within the aperture of the bracket. When the bolt is inserted into the bracket, the wheel assembly is effectively prevented from rotating about the leg 214 and is in a fixed position such as being aligned with the frame so that the wheelchair will not rotate about the rear caster wheels, but will move in a straight direction with regard to such rear caster wheels. When the bolt is moved to its bracket-disengaging position, the wheel assembly is free to rotate about the leg 214, thereby permitting the rear of the wheelchair to also move freely laterally or be directional.

The bolt is inserted through an opening extending through the housing 220. A second sleeve 238 can be provided within the housing or a cylindrical opening extending through the housing can be present. A spring such as compression spring 240 can be provided in the housing to impart tension to the bolt 236. The spring can be a compression or tension spring or the like. In the embodiment shown in FIG. 11, a compression spring is illustrated. A bushing or guide bushing 244 is also positioned within the housing. The guide bushing is fixed to the bolt such that when the bolt is moved upwardly or downwardly the guide bushing correspondingly moves upwardly or downwardly. The guide bushing compresses or releases the compression spring 240. The compression spring 240 is mounted to operate against a fixed spacer tube 242 which extends from the housing to a support 246. The bolt 236 is pivotally connected to a caster lock lever 248 which can be an offset cam lever as is illustrated. The lever 248 is pivotally connected through pivot pin 250 to the bolt. In the position shown in FIG. 11, the caster lock lever 248 maintains the bolt in a bracket-engaging position. When the lever is moved upwardly, the off center pivot pin 250 raises, thereby raising the bolt to a bracket-disengaging position and simultaneously applying compression on the spring 240. When the lever is moved downwardly, the compression spring extends, moving the bolt into the bracket-engaging position. The throw on the bolt, axial movement upwardly and downwardly, is sufficient to engage the bracket 234 when the leg 214 is positioned in its surface-engaging position; i.e., the leg and wheel assembly fully lowered, thereby raising the wheelchair frame, permitting the drive wheels to be removed.

Included with the assembly shown in FIG. 11 is a floor stand bracket which includes the mounting bracket 252. The floor stand bracket provides for a stabilization of the wheelchair when the drive wheels have been removed. That is, the operation of the assembly 210 wherein the wheel assembly 226 is lowered to a surface-engaging position lifts the rear of the wheelchair a sufficient distance from the surface upon which it rests such that the drive wheels can be removed as is discussed above. Once the drive wheels have been removed, then the wheelchair is free to roll on the front caster wheels as well as the rear caster wheels 228. However, in some instances it is desirable to prevent movement of the wheelchair. In such instances, the lever 14 (shown in FIG. 2) is moved upwardly to the ground disengaging position which raises the wheel assembly 226. When the wheel assembly 226 raises, the rear of the wheelchair can be lowered to rest on the floor stand bracket.

The floor stand bracket includes a mounting bracket 252 which can be in two pieces 251 and 252 shown in FIG. 11. The two pieces can be bolted to the wheelchair frame using suitable bolts 253. The floor stand bracket assembly includes a foot pad 254 which is mounted to the mounting bracket 252 such as through a threaded bolt assembly 256 wherein a threaded bolt is received within a threaded aperture on the mounting bracket. The use of a threaded bolt assembly provides a positionability with regard to height of the foot pad 254. That is, the foot pad can be adjustable by rotating the foot pad, causing the threaded bolt to move in or out the threaded cavity of the mounting bracket. A lock nut 258 can be provided on the assembly to prevent movement of the foot pad after the proper height has been selected.

The assembly herein providing a caster wheel assembly 226 on the lifting mechanism provides a wheelchair with expanded capabilities. For example, when the drive wheels have been removed, the wheelchair is narrowed. Thus, the chair can be maneuvered in cramped quarters or along narrower passageways. Such a wheelchair can be used to load passengers in an airplane without removing the passenger from their normal chair. The wheelchair can pass through narrow doors making it possible for the disabled to travel without worry about getting into facilities such as bathrooms. The chair can store compactly in small car trunks. The chair herein permits the person confined to the wheelchair to effectively work in many job sites without modification of such job sites. A wheelchair having the characteristics herein described also facilitates transfers by the patient to adjoining surfaces such as in making lateral transfers to a car, toilet seat, bathtub bench and the like. A wheelchair as described herein can be used with the rear caster wheels in a locked position to prevent drift of the wheelchair when the wheelchair is used as a travel chair. The wheelchair described herein can be used as an arthritic chair with foot rest detached and rear caster wheels in a swivel mode. The wheelchair described herein can be used to immobilize patients by removing the drive wheels and permitting the wheelchair to rest on the floor stand where selfmobilization of a patient is inappropriate when the patient is not attended. The floor stand bracket can be adjustable in height to create a moderate tilt or positioning of the wheelchair to relieve pressure exerted on the patient. The use of the floor stand bracket also provides a stability to the wheelchair, thus permitting a safer transfer from the wheelchair to an adjoining surface. The wheelchair herein also permits 90° turns in very restricted areas such as "T" hall locations on exiting from narrow doorways. Many other advantages and additional capabilities to the wheelchair will be recognized by those having skill in the art and by wheelchair confined disabled patients.

The invention herein also provides an additional benefit other than facilitating drive wheel removal. With both wheels removed, the wheelchair may be reclined at an angle reward by simultaneously operating both actuator levers to their full "up" position. This lowers the legs to their normal surface-disengaged position. However, the absence of the large wheels allows the rear of the chair to be lowered. This provides an alternative seating position for the patient which may tend to be restful.

While the invention has been described with respect to some preferred embodiments, it will be apparent to skilled artisans that other modifications and improvements may be made without departing from the scope and spirit of the invention. Therefore, it will be understood that the invention is not to be limited by the specific, illustrative embodiments, but only by the scope of the appended claims.

We claim:

1. An assembly capable of mounting to a wheelchair in duplicate to provide removal of the drive wheels from the wheelchair while maintaining mobility, the assembly comprising:

(a) a connector block mounted on a wheelchair frame, the connector block having a first orifice extending therethrough for receiving an axle of a drive wheel of the wheelchair and a second orifice extending therethrough and at least partially intersecting the first orifice;

(b) an axle for a drive wheel having an annular groove at one end and extending into the first orifice of the connector block such that the annular groove aligns with the second orifice;

(c) a rod rotatable about its longitudinal axis and extending through the second orifice of the connector block with at least a portion of the rod having a generally circular cross section and a slot therealong, which slot aligns with the first orifice of the connector block;

(d) a first arm fastened to and extending radially from the rod and which moves with rotation of the rod;

(e) a second arm pivotally linked to the first arm;

(f) a leg pivotally linked to the second arm and slidably mounted to the frame; and (g) a caster wheel assembly attached to the leg which caster wheel assembly cooperates with the rod, first arm, second arm and leg to move between a surface-engaging position and surface-disengaging position upon rotation of the rod, such that the rod intersects the annular groove of the axle when the caster wheel assembly is in the surface-disengaging position and the slot on the rod aligns with the first orifice and faces the annular groove of the axle when the caster wheel assembly is in the surface-engaging position.

2. An assembly as recited in claim 1 further comprising a forwardly extending portion of the rod which extends toward the front of the wheelchair and wherein a handle is attached to the rod adjacent the front of the wheelchair and further comprising mounting means for mounting such forwardly extending portion of the rod to the wheelchair frame.

3. An assembly as recited in claim 1 further comprising tensioning means operatively connected to the leg for cooperating with the rod, first arm, second arm and leg to retain the leg and caster wheel assembly in the surface-disengaging position.

4. An assembly as recited in claim 3 wherein the tensioning means comprises an extension spring having one end attached to the connector block and its remaining end attached to the leg.

5. An assembly as recited in claim 3 wherein the tensioning means comprises a tubular sleeve extending around the leg and a compression spring within the tubular sleeve and also extending around the leg.

6. An assembly as recited in claim 3 wherein the tensioning means comprises a torsional spring affixed to the connector block and rod.

7. An assembly as recited in claim 1 further comprising selectively positionable swivel-stop means mounted on the wheelchair frame for positioning in a caster wheel assembly engaging position or a caster wheel assembly disengaging position wherein such swivel-stop means is positioned in the caster wheel assembly engaging position to prevent swiveling of the caster wheel assembly and is positioned in the caster wheel assembly disengaging position to permit the caster wheel assembly to freely swivel about the leg.

8. An assembly as recited in claim 7 wherein the selectively positionable means comprises a positionable second rod slidably mounted to the wheelchair frame and a bracket mounted on the caster wheel assembly having an opening therein for receiving at least a portion of the second rod, wherein the second rod can be selectively positioned to engage the opening in the bracket to prevent swiveling of the caster wheel assembly and positioned to disengage from the opening in the bracket to permit swiveling of the caster wheel assembly.

9. An assembly as recited in claim 1 wherein the caster wheel assembly comprises:

(a) a supporting block mounted on the wheelchair frame, which supporting block includes a first cylindrical opening extending therethrough for receiving the leg and a second cylindrical opening extending therethrough;

(b) a caster wheel attached to the leg, which caster wheel can swivel about the leg;

(c) a first bracket attached to the caster wheel, which first bracket includes an opening which can be aligned with the second cylindrical opening extending through the supporting block;

(d) a positionable second rod extending through and movable within the second cylindrical opening of the supporting block such that at least a portion of the second rod can be positioned to extend through the second cylindrical opening and into the opening in the first bracket; and (e) means for moving the second rod from a position engaging the opening in the first bracket to a position wherein the second rod is disengaged from the opening in the first bracket.

10. An assembly as recited in claim 9 wherein the means for moving the second rod comprises an off center cam lever on an end of the second rod and a fixed, second rod supporting, second bracket whereby movement of the lever against the second bracket moves the second rod from a position engaging the opening in the first bracket to a position wherein the second rod is disengaged from the opening in the first bracket.

11. An assembly as recited in claim 10 wherein the means for moving the second rod further comprises tensioning means for maintaining the second rod in a position engaging the opening in the first bracket.

12. An assembly as recited in claim 11 wherein the tensioning means comprises a cylindrical sleeve extending at least partially into the second cylindrical opening and around the second rod and a compression spring within the second cylindrical opening and extending around the second rod whereby tension is the spring maintains the second rod in a position engaging the opening in the first bracket.

13. An assembly as recited in claim 9 further comprising tensioning means operatively connected to the leg for cooperating with the rod, first arm, second arm and leg to retain the leg and caster wheel assembly in the surface-disengaging position.

14. An assembly as recited in claim 13 wherein the tensioning means comprises a tubular sleeve, a portion of which extends through the first cylindrical opening of the block around the leg and a compression spring within the tubular sleeve and also extending around the leg.

15. An assembly as recited in claim 1 further comprising a stabilizing support means mounted on the wheelchair frame for supporting the wheelchair frame on the surface upon which the wheelchair rests when the drive wheels have been removed and the caster wheel assembly has been positioned in the surface-disengaging position.

16. An assembly as recited in claim 15 wherein the floor support means comprises a support bracket mounted on the wheelchair frame and a foot threadably mounted in the bracket whereby the spacing between the foot and wheelchair frame can be varied by rotating the foot about the threaded mounting.

17. An assembly capable of mounting to a wheelchair frame in duplicate to provide removal of the drive wheels from the wheelchair while maintaining mobility, the assembly comprising:

(a) a connector block mounted on a wheelchair frame, the connector block having a first orifice extending therethrough for receiving an axle of a drive wheel of the wheelchair and a second orifice extending therethrough and at least partially intersecting the first orifice;

(b) an axle for a drive wheel having an annular groove at one end and extending into the first orifice of the connector block such that the annular groove aligns with the second orifice;

(c) a first rod rotatable about its longitudinal axis and extending through the second orifice of the connector block with at least a portion of the first rod having a generally circular cross section and a slot therealong, which slots aligns with the first orifice of the connector block;

(d) a first arm fastened to and extending radially from the first rod and which moves with rotation of the first rod;

(e) a second arm pivotally linked to the first arm;

(f) a leg pivotally linked to the second arm and slidably mounted to the frame;

(g) a supporting block mounted on the wheelchair frame, which supporting block includes a first cylindrical opening extending therethrough for receiving the leg and a second cylindrical opening extending therethrough;

(h) a caster wheel assembly attached to the leg, which caster wheel assembly can swivel about the leg and which cooperates with the first rod, first arm, second arm and leg to move between a surface-engaging position and surface-disengaging position upon rotation of the first rod, such that the first rod intersects the annular groove of the axle when the caster wheel assembly is in the surface-disengaging position and the slot on the first rod aligns with the first orifice and faces the annular groove of the axle when the caster wheel assembly is in the surface-engaging position;

(i) a bracket attached to the caster wheel assembly, which bracket includes an opening which can be aligned with the second cylindrical opening extending through the supporting block;

(j) a positionable second rod extending through and movable within the second cylindrical opening such that at least a portion of the second rod can be positioned to extend through the second cylindrical opening and into the opening in the bracket; and (k) means for moving the second rod from a position engaging the opening in the bracket to a position wherein the second rod is disengaged from the opening in the bracket.

18. An assembly as recited in claim 17 wherein the means for moving the second rod comprises an off center cam lever on an end of the second rod and a fixed second rod support whereby movement of the lever against the support moves the second rod from a position engaging the opening in the bracket to a position wherein the second rod is disengaged from the opening in the bracket.

19. An assembly as recited in claim 18 wherein the means for moving the second rod further comprises tensioning means for maintaining the second rod in a position engaging the opening in the bracket.

20. An assembly as recited in claim 19 wherein the tensioning means comprises a cylindrical sleeve extending at least partially into the second cylindrical opening and around the second rod and a compression spring within the second cylindrical opening and extending around the second rod whereby tension in the spring maintains the second rod in a position engaging the opening in the bracket.

21. An assembly capable of mounting to a wheelchair frame in duplicate to provide removal of the drive wheels from the wheelchair while maintaining mobility, the assembly comprising:

(a) a connector block mounted on a wheelchair frame, the connector block having a first orifice extending therethrough for receiving an axle of a drive wheel of the wheelchair and a second orifice extending therethrough and at least partially intersecting the first orifice;

(b) an axle for a drive wheel having an annular groove at one end and extending into the first orifice of the connector block such that the annular groove aligns with the second orifice;

(c) a first rod rotatable about its longitudinal axis and extending through the second orifice of the connector block with at least a portion of the first rod having a generally circular cross section and a slot therealong, which slot aligns with the first orifice of the connector block;

(d) a first arm fastened to and extending radially from the first rod and which moves with rotation of the first rod;

(e) a second arm pivotally linked to the first arm;

(f) a leg pivotally linked to the second arm and slidably mounted to the frame;

(g) a supporting block mounted on the wheelchair frame, which supporting block includes a first cylindrical opening extending therethrough for receiving the leg and a second cylindrical opening extending therethrough;

(h) a caster wheel assembly attached to the leg, which caster wheel assembly can swivel about the leg and which cooperates with the first rod, first arm, second arm and leg to move between a surface-engaging position and surface-disengaging position upon rotation of the first rod, such that the first rod intersects the annular groove of the axle when the caster wheel assembly is in the surface-disengaging position and the slot on the first rod aligns with the first orifice and faces the annular groove of the axle when the caster wheel assembly is in the surface-engaging position;

(i) tensioning means operatively connected to the leg for cooperating with the first rod, first arm, second arm and leg to retain the leg and caster wheel assembly in the surface-disengaging position;

(j) a bracket attached to the caster wheel assembly, which bracket includes an opening which can be aligned with the second cylindrical opening extending through the supporting block;

(k) a positionable second rod extending through and movable within the second cylindrical opening of the supporting block such that at least a portion of the second rod can be positioned to extend through the second cylindrical opening and into the opening in the bracket;

(l) a cylindrical sleeve extending at least partially into the second cylindrical opening of the supporting block and around the second rod and a compression spring within the second cylindrical opening and extending around the second rod whereby tension in the spring maintains the second rod in a position engaging the opening in the bracket; and (m) an off center cam lever on an end of the second rod and a fixed second rod support whereby movement of the lever against the support moves the second rod from a position engaging the opening in the bracket to a position wherein the second rod is disengaged from the opening in the bracket.

* * * * *